(12) United States Patent
Greene

(10) Patent No.: US 8,140,791 B1
(45) Date of Patent: Mar. 20, 2012

(54) TECHNIQUES FOR BACKING UP DISTRIBUTED DATA

(75) Inventor: Christopher Greene, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 435 days.

(21) Appl. No.: 12/391,747

(22) Filed: Feb. 24, 2009

(51) Int. Cl.
*G06F 13/00* (2006.01)
(52) U.S. Cl. .................................. 711/162; 711/168
(58) Field of Classification Search .................. 711/162, 711/168
See application file for complete search history.

(56) References Cited

U.S. PATENT DOCUMENTS

| | | | |
|---|---|---|---|
| 6,675,177 B1 * | 1/2004 | Webb | 1/1 |
| 7,415,585 B1 * | 8/2008 | Rossi | 711/162 |
| 7,549,028 B2 * | 6/2009 | Thompson et al. | 711/162 |
| 7,921,328 B1 * | 4/2011 | Gulati et al. | 714/15 |
| 2004/0093361 A1 * | 5/2004 | Therrien et al. | 707/204 |
| 2006/0095664 A1 * | 5/2006 | Wichelman et al. | 711/114 |
| 2008/0052327 A1 * | 2/2008 | Buah | 707/204 |
| 2008/0184241 A1 * | 7/2008 | Headrick et al. | 718/102 |
| 2008/0244601 A1 * | 10/2008 | Zeis et al. | 718/104 |
| 2009/0193064 A1 * | 7/2009 | Chen et al. | 707/204 |

OTHER PUBLICATIONS

Commvault, "A CommVault White Paper: CommVault Galaxy Backup & Recovery," CommVault Systems, Inc.; 2008; pp. 1-39.
Samsung, "Samsung Announces Mass Production of Spinpoint F1 RAID Class Hard Disk Drives for Enterprise Storage and Surveillance Applications," found at http://www.samsung.com/us/business/semiconductor/newsView.do?newsid=932; printed on May 7, 2009; pp. 1-2.
FalconStor Software, "Continuous Data Protector (CDP)," FalconStor Software; 2009; pp. 1-4.

* cited by examiner

*Primary Examiner* — Reba I Elmore
(74) *Attorney, Agent, or Firm* — Wilmer Cutler Pickering Hale and Dorr

(57) ABSTRACT

Techniques for backing up distributed data are disclosed. In one particular exemplary embodiment, the techniques may be realized as a method for backing up distributed data comprising identifying one or more sources of distributed data targeted for backup, identifying two or more backup storage locations, determining which one or more backup storage locations of the two or more identified backup storage locations to utilize for a backup job based at least in part on one or more specified preferences, and configuring, for at least one of the sources of distributed data, the backup job using the one or more backup storage locations.

19 Claims, 3 Drawing Sheets

TECHNIQUES FOR BACKING UP DISTRIBUTED DATA

FIELD OF THE DISCLOSURE

The present disclosure relates generally to backup of data and, more particularly, to techniques for backing up distributed data.

BACKGROUND OF THE DISCLOSURE

Distributed data may be located on a plurality of hosts and/or servers across one or more networks. Distributed data may also be located on computing clusters which may periodically add or drop nodes to a computing cluster. Backup storage locations may be located on network accessible locations remote from one or more nodes or other sources of distributed data which may be targeted for backup. Backup jobs may be scheduled for nodes or sources of distributed data which may require transmission of backup data across a Wide Area Network (WAN) and may increase network congestion and latency. Backup jobs may also be scheduled for heavily utilized nodes, heavily utilized servers, heavily utilized backup locations, poor performing nodes, poor performing servers, and/or poor performing backup locations. Such scheduling may impair performance for one or more users and/or for one or more backup jobs.

Furthermore, backup efforts may be scheduled without considering whether a distributed data source is an active node or a passive node. Such backup efforts may unnecessarily or undesirably impact performance and/or users on an active node. Backup efforts may also be scheduled for a passive node without regard to the quality or currency of data stored on a passive node.

Additionally, distributed data may contain data which may be related to other data, such as databases which are part of the same implementation (e.g., databases associated with one Microsoft Exchange Server). Other examples may include distributed data which is to be part of a backup set in an incremental backup strategy. Such data may be backed up to backup storage locations which do not contain the related data.

In view of the foregoing, it may be understood that there are significant problems and shortcomings associated with current technologies utilized for backing up distributed data.

SUMMARY OF THE DISCLOSURE

Techniques for backing up distributed data are disclosed. In one particular exemplary embodiment, the techniques may be realized as a method for backing up distributed data comprising identifying one or more sources of distributed data targeted for backup, identifying two or more backup storage locations, determining which one or more backup storage locations of the two or more identified backup storage locations to utilize for a backup job based at least in part on one or more specified preferences, and configuring, for at least one of the sources of distributed data, the backup job using the one or more backup storage locations.

In accordance with other aspects of this particular exemplary embodiment, the one or more specified preferences may include utilizing the at least one source of distributed data and the one or more backup storage locations resulting in a low resource impact from the backup job.

In accordance with further aspects of this particular exemplary embodiment, the low resource impact may be based at least in part on a calculated network distance between the at least one source of distributed data and the one or more backup storage locations.

In accordance with additional aspects of this particular exemplary embodiment, the low resource impact may be based at least in part on at least one of: minimizing network congestion, available storage space of the one or more backup storage locations, processing capability of the one or more backup storage locations, resource utilization associated with the one or more backup storage locations, an ability of the one or more backup storage locations to support a parallel backup process, and an input/output rate of the one or more backup storage locations.

In accordance with additional aspects of this particular exemplary embodiment, the one or more specified preferences may include an ability of the one or more backup storage locations to store multiple related backups.

In accordance with additional aspects of this particular exemplary embodiment, the multiple related backups may comprise different Microsoft Exchange Databases associated with a single Microsoft Exchange Server.

In accordance with additional aspects of this particular exemplary embodiment, the multiple related backups may comprise full and incremental backups that comprise a backup set.

In accordance with additional aspects of this particular exemplary embodiment, storing the multiple related backups at a single backup storage location may enable the creation of a synthetic full backup.

In accordance with additional aspects of this particular exemplary embodiment, the one or more sources of distributed data targeted for backup may be identified based at least in part on one or more specified characteristics of the one or more sources of distributed data targeted for backup.

In accordance with additional aspects of this particular exemplary embodiment, the one or more specified characteristics may include at least one of: a health of the at least one source of distributed data, a computational load on a host of the at least one source of distributed data, an input/output load on a host, a number of units targeted for backup stored on a host, an ability of a host to support a parallel backup process, and a length of time a host is available for backup.

In accordance with additional aspects of this particular exemplary embodiment, the one or more sources of distributed data targeted for backup may comprise data associated with an application and replicated by the application.

In accordance with additional aspects of this particular exemplary embodiment, the one or more sources of distributed data targeted for backup may be associated with a computing cluster and may be identified based at least in part on a user specified preference including at least one of whether the at least one source of distributed data is associated with an active node of a computing cluster, whether the at least one source of distributed data is associated with a passive node of a computing cluster, whether an active node is available, and whether a passive node is available.

In accordance with additional aspects of this particular exemplary embodiment, backing up distributed data may further comprise configuring a geographically diverse storage pool using two or more identified backup storage locations.

In accordance with additional aspects of this particular exemplary embodiment, backing up distributed data may further comprise utilizing one or more routing algorithms to determine a relative distance between the at least one source of distributed data and the one or more backup storage locations.

In accordance with additional aspects of this particular exemplary embodiment, backing up distributed data may further comprise utilizing a routing algorithm to determine a lowest cost path between the at least one source of distributed data and a backup storage location.

In accordance with additional aspects of this particular exemplary embodiment, the one or more backup storage locations may be utilized based at least in part on a data throughput sufficient to complete a backup from the at least one source of distributed data in a specified period of time.

In accordance with additional aspects of this particular exemplary embodiment, backing up distributed data may further comprise calculating a resource impact for backing up the one or more sources of distributed data targeted for backup, and identifying one or more locations to add backup storage based at least in part on a high calculated resource impact for the one or more sources of distributed data.

In accordance with additional aspects of this particular exemplary embodiment, the techniques may be realized as at least one processor readable carrier for storing a computer program of instructions configured to be readable by at least one processor for instructing the at least one processor to execute a computer process for performing the method as recited in claim 1.

In another particular exemplary embodiment, the techniques may be realized as an article of manufacture for backing up distributed data, the article of manufacture comprising at least one processor readable carrier, and instructions carried on the at least one carrier. The instructions may be configured to be readable from the at least one carrier by at least one processor and thereby cause the at least one processor to operate so as to identifying one or more sources of distributed data targeted for backup, identify two or more backup storage locations, determine which one or more backup storage locations of the two or more identified backup storage locations to utilize for a backup job based at least in part on one or more specified preferences, and configure, for at least one of the sources of distributed data, the backup job using the one or more backup storage locations.

In yet another particular exemplary embodiment, the techniques may be realized as a system for backing up distributed data comprising one or more processors communicatively coupled to a server. The server may be configured to identify one or more sources of distributed data targeted for backup, identify two or more backup storage locations, determine which one or more backup storage locations of the two or more identified backup storage locations to utilize for a backup job based at least in part on one or more specified preferences, and configure, for at least one of the sources of distributed data, the backup job using the one or more backup storage locations.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
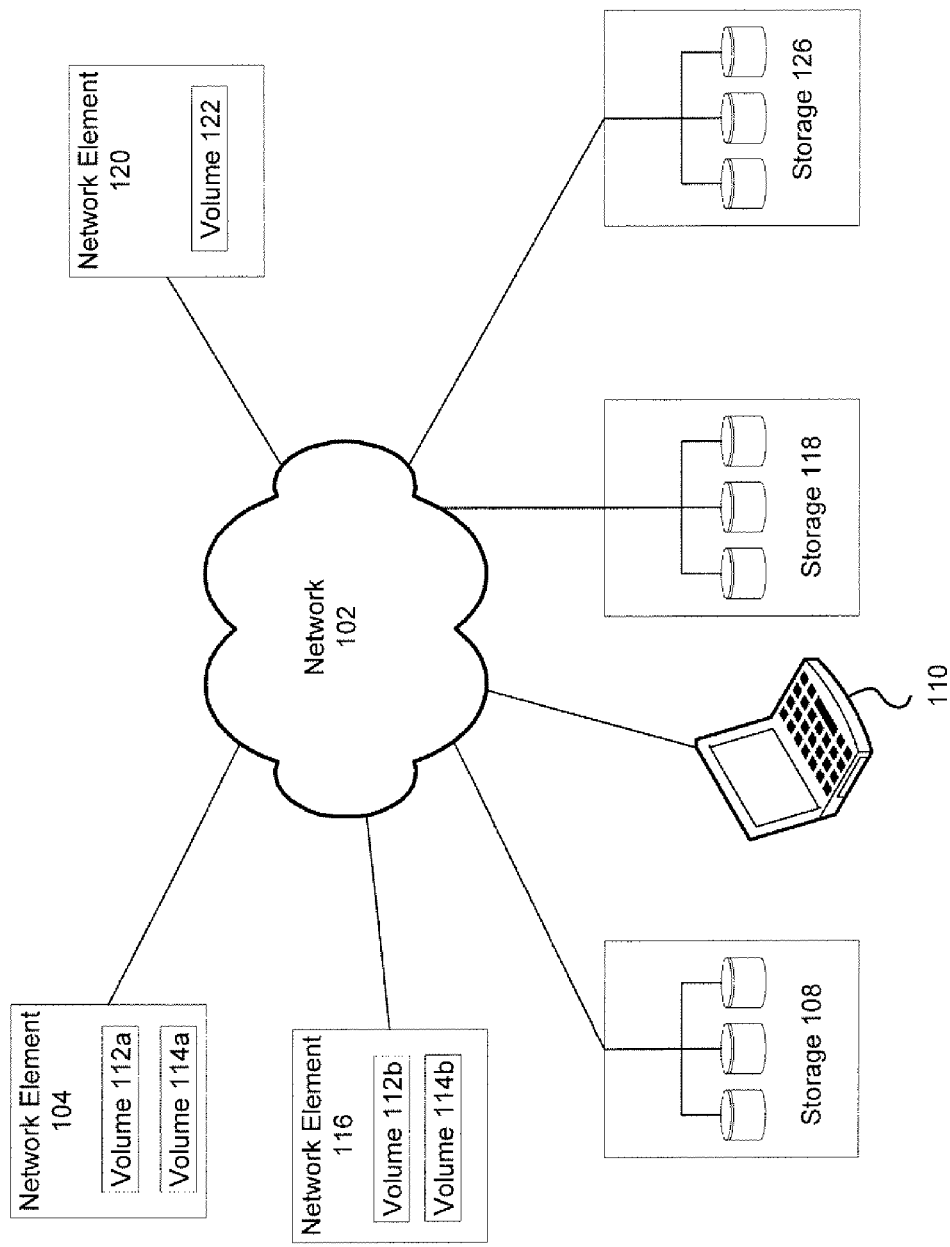
FIG. 1 shows a system 100 for backing up distributed data in accordance with an embodiment of the present disclosure.

Referring to FIG. 1, there is shown a system 100 for backing up distributed data in accordance with an embodiment of the present disclosure. FIG. 1 is a simplified view of system 100, which may include additional elements that are not depicted. Network elements 104, 116, and 120 may be communicatively coupled to network 102. Network element 104 may contain volumes 112a and 114a. Network element 116 may contain volumes 112b and 114b. Network element 120 may contain volume 122. Storage 108, 118, and 126 may be communicatively coupled to network 102.

Network 102 may be a local area network (LAN), a wide area network (WAN), the Internet, a cellular network, a satellite network, or another network that permits communication between network elements 104, 116, and 120, storage 108, 118, and 126, and other devices communicatively coupled to network 102.

Network elements 104, 116, and 120 may be application servers, backup servers, network storage devices or other devices communicatively coupled to network 102. Network elements 104, 116, and 120 may utilize storage 108, 118, and 126 for the backup of application data or other data. Network elements 104, 116, and 120 may be nodes in a computing cluster which may utilize storage 108, 118, and 126 as unshared, clustered storage. In one or more embodiments, storage 108, 118, and 126 may be shared, clustered storage.

Storage 108, 118, and 126 may be local, remote, or a combination thereof to network elements 104, 116, and 120. Storage 108, 118, and 126 may utilize a redundant array of inexpensive disks (RAID), a redundant array of inexpensive nodes (RAIN), tape, disk, or other computer accessible storage. In one or more embodiments storage 108, 118, and 126 may be a storage area network (SAN), an internet small computer systems interface (iSCSI) SAN, a Fibre Channel SAN, a common. Internet File System (CIFS), network attached storage (NAS), or a network file system (NFS).

In one or more embodiments, storage 108, 118, and/or 126 may be configured into a storage pool. The storage pool may be a geographically diverse storage pool which may be available to a backup server or process. The storage pool may enable a backup server and/or backup process to analyze backup requirements and utilize one or more backup storage locations according to the requirements or preferences for a backup job. For example, a backup job may be configured to use a backup storage location which is located at a point on a network closest to a backup target source.

Volumes 112a, 114a, 112b, 114b, and 122 may include data written by one or more applications, such as mail servers, databases, web servers, collaboration software, or other applications hosted by network elements 104, 116, and 120. Volumes 112a, 114a, 112b, 114b, and 122 may contain one or more user created data files such as, for example, a document, a list, an image file, an email, a posting, a web page, xml data, a sound file, and a video file. Volumes 112a, 114a, 112b, 114b, and 122 may contain data stored in one or more formats or data structures. Data structures may be determined by an underlying platform or system supporting an application. Volumes 112a, 114a, 112b, 114b, and 122 may be unshared storage containing clustered data.

Computer 110 may be a desktop computer, a laptop computer, a server, a backup server or other computer capable of managing the backup of distributed data. Computer 110 may receive data from user input, a network management system, a network provisioning system, a management information base, a database, a file, a web service, and/or an application programming interface. Computer 110 may query other systems and/or local or remote storage such as network elements 104, 116, and 120, and storage 108, 118, and 126 to obtain network information, distributed data host information, distributed data application information, and/or backup storage information. Computer 110 may be able to communicate with nodes, hosts, applications, and/or backup storage locations directly via an Application Programming Interface (API), a Remote Procedure Call (RPC), an interface tables, a web service, Extensible Markup Language (XML) based interfaces, Simple Object Access Protocol (SOAP) based interfaces, common request broker architecture (CORBA) based interfaces, and/or other interfaces for sending or receiving information.

In one or more embodiments, network elements 104 and 116 may be nodes in a computing cluster. For example, network element 104 may be an active node and network element 116 may be a passive node. Network element 116 may contain a replicated copy of one or more volumes or other units of storage from network element 104. If a backup request is received for one or more particular units of storage, such as for example, volumes 112 and 114, a backup server, a backup management process, or other process may attempt to determine which sources of the volumes to use and which backup storage location to use (e.g., 112a or 112b and 114a or 114b). According to one or more embodiments, data replication may be based on a file level replication or at another unit of data storage. If a backup request is received for one or more particular files, a backup server, a backup management process, or other process may attempt to determine which sources of the files to use and which backup storage location to use.

In one or more embodiments, a backup management process may utilize and/or gather data associated with one or more backup target sources, one or more backup storage locations, network routing information, computing cluster membership information, and other backup related data. For example, a process running on computer 110 or a component of computer 110 may gather such data. Data associated with one or more backup target sources may include: the health of a source of distributed data, a computational load on a host of the source, an input/output load on a host, a number of units targeted for backup stored on a host (e.g., the number of volumes on the host targeted for backup), an ability of a host to support a parallel backup process, a length of time a host is available for backup, and other factors associated with a source of backup data, a network path, or a backup storage location. Determining cluster membership information may identify additional nodes in a cluster which may contain replicas or copies of the data targeted for backup. Network routing information may be utilized to determine a location of a node or a source of distributed data on the network. Network routing information may also be utilized to identify network congestion associated with a source of distributed data, with a backup storage location, or with one or more portions of a network path between a source of distributed data and a backup storage location. Network routing information may include bandwidth information for one or more network components. A backup management process may also gather data or utilize data associated with the input/output capabilities of a source of distributed data.

A backup management process may also gather and/or utilize other computing cluster information to determine and/or configure a backup process or backup job. For example, a backup management process may gather information identifying one or more primary nodes (e.g., nodes in an active configuration), one or more secondary nodes, the health of replicated data on secondary nodes (e.g., whether replication has stopped for a copy or whether the copy is corrupt), the replication latency of a copy (the delay between when a change occurs on a primary copy and when the change is written to the secondary copy), the failover order of a replication copy (e.g., which node is next to take over if a primary node fails, which node is second, etc.), and other information associated with a computing cluster.

In one or more embodiments, a user, such as a backup administrator, may use computer 110 or an interface to a backup server and/or a backup process to specify preferences associated with a clustered environment or other backup preferences. Such preferences may be stored. The preferences may include whether to use a primary node only, a secondary node only, a primary node only if a secondary node is not available, or other options. Other preferences may specify requirements about the health of a copy, a maximum replication latency acceptable, a preferred failover order of a node used as a source of replicated data (e.g., use only the node next in line to take over if the primary node fails), a preferred source node or nodes, or other backup preferences. The ability to specify a preferred backup target source, such as a preferred node or nodes, may enable a user to specify one or more nodes whose operation may be least impacted by a backup process. Additionally, a user may set preferences to indicate node or backup target sources to avoid, such as heavily loaded nodes or nodes supporting critical operations.

According to one or more embodiments, application level replication information may be gathered by computer 110 and/or a backup process. For example, a database or another application may handle its own replication. Such application level replication and/or copying may occur in a clustered or non-clustered environment. Application level replication may specify an active or primary copy of an application which may be located on a computing platform such as a non-clustered computer, a primary node, and/or a secondary node. Application level replication may further specify one or more secondary copies of an application. Secondary copies of application data whose replication is managed by the application may be located on a computing platform regardless of whether the computing platform is clustered, non-clustered, a primary node, or a secondary node. Thus, computer 110 may, for example, identify a primary copy of application data, such as a primary copy of a database which handles replication of the database data. The primary copy of application data may be located on a secondary or passive node of a cluster. Accordingly, backup preferences may specify a primary copy of an application regardless of whether the host for the copy is a primary node or a secondary node. In another example, backup preferences may be configured to specify a secondary copy of an application regardless of whether the host for the copy is a primary node or a secondary node.

In addition to evaluating backup target source characteristics and preferences a backup process or component may evaluate one or more characteristics of a backup storage location. For example, a backup process running on computer 110 may analyze available storage space of a backup storage location, processing capability of a backup storage location, resource utilization associated with a backup storage location (e.g., CPU utilization of a host, network traffic on a host, etc), an ability of a backup storage location to support a parallel backup process, and/or an input/output (I/O) rate of a backup storage location. For example, a backup process running on computer 110 may analyze data throughput of one or more backup storage locations to determine whether they are sufficient to complete a backup from a source of distributed data in a specified period of time. In this example, a backup target source (e.g., a database host) may be available for backup for a specified period of time in order to avoid or minimize service disruptions. A backup process running on computer 110 may determine the size of data to be backed up and other factors in addition to the throughput or Input/Output (I/O) capabilities of a backup storage location. If a backup may not be completed in a specified period of time, a backup process or server may analyze the ability of a backup target source and/or a backup storage location to support a parallel backup process. For example, a backup target source may contain multiple disk devices, each having one or more portions of data to be backed up. A backup process may utilize multiple threads or processes, such as one thread per disk device. If parallel backup efforts may not be sufficient to complete a backup in a specified period of time, a backup process may utilize other backup target sources and/or backup storage locations for one or more portions of a backup job.

The available storage space of a backup storage location may be evaluated by a backup process with respect to the size of one or more portions of data targeted for backup. A backup process may also evaluate portions of data already stored on a backup storage location which are associated with or related to data targeted for backup. For example, one or more specified preferences may include an ability of the backup storage location to store multiple related backups. The multiple related backups may be different Microsoft Exchange Databases from a single Microsoft Exchange Server, full and incremental backups that comprise a backup set, or other related backups.

Storing multiple related backups at a single backup storage location may enable the creation of a synthetic full backup or provide other advantages.

According to some embodiments, a backup process or component may evaluate one or more characteristics of a backup target source in relation to a backup target location. For example, a backup process running on computer 110 may analyze one or more network paths to minimize network congestion and/or network traffic occurring as a result of a backup job. As described above, storage 108, 118, and/or 126 may be configured into a storage pool. Computer 110 may utilize one or more routing algorithms, such as the border gateway protocol (BGP), to identify the location of a backup target source, a backup storage location, and/or one or more network paths between a backup target source and a backup storage location. Other routing protocols or algorithms, such as the minimum spanning tree algorithm, may be used to determine the lowest cost network path between two locations, such as a backup target source and a backup storage location. Other methods, such as heuristic methods, may be applied. Heuristic methods may be used to identify a relative cost or weighting for one or more factors of a decision. The use of heuristic methods may be used to improve performance. Once one or more target sources and one or more backup storage locations have been identified, a backup process or component may evaluate one or more characteristics of identified network paths. For example, a backup process running on computer 110 may evaluate a resource impact or cost of using a backup target source, a backup storage location, and/or one or more network paths between a backup target source and a backup storage location. Computer 110 may determine or query one or more components of network 102 to identify network congestion and may further determine whether sufficient bandwidth is available to accommodate a backup job. Computer 110 may identify a backup storage location which may have less of a resource impact, such as a backup storage location which may result in less network traffic during the running of a backup job. For example, computer 110 may schedule a backup of volume 112*b* on network element 116 to use backup storage on storage 108 instead of storage 126. Storage 108 may be located closer, in terms of network transit time, to network element 116 than storage 126. This may reduce network congestion and traffic. As discussed above, computer 110 may consider other resource costs, such as a CPU utilization or input/output capabilities of storage 108 and storage 126, capabilities and utilization of storage 108 and storage 126, and capabilities and utilization of network element 116 and network element 104.

According to one or more embodiments, computer 110 may store metadata about one or more backup target sources, one or more backup storage locations, and/or network metadata in storage associated with computer 110 (not shown). For example, computer 110 may store metadata associated with a computing cluster, such as membership of the cluster (i.e., identification of nodes in a cluster) and/or location of nodes in a cluster. Computer 110 may store metadata associated with backup storage locations such as storage capacities, utilization, or other backup storage metadata. Such backup related metadata may enable computer 110 and/or a backup process to evaluate one or more backup preferences, requirements, and/or conditions to determine a backup job configuration.

According to some embodiments, backup analysis may be performed by a backup server, process, or component, such as computer 110. Such backup analysis may calculate resource impacts or costs of one or more backup jobs in order to identify potential improvements to a backup process. For example, computer 110 may identify a backup target source for which the closest backup storage location requires streaming data across a WAN. This may result in a high resource impact. Such a situation may be identified in order to correct it by adding backup storage closer on the network to the backup target source. Other backup analysis may identify backup storage locations which are over utilized (e.g., have significant input/output bottlenecks, or network congestion), under utilized, or inadequate (e.g., require additional storage capacity). Reporting, notifications, monitoring, and/or alerts may be configured for specified backup analysis. For example, a report may be generated identifying potential backup strategy deficiencies, such as inadequate storage capacity or the requirement to stream backup data across a WAN.

Figure 2:
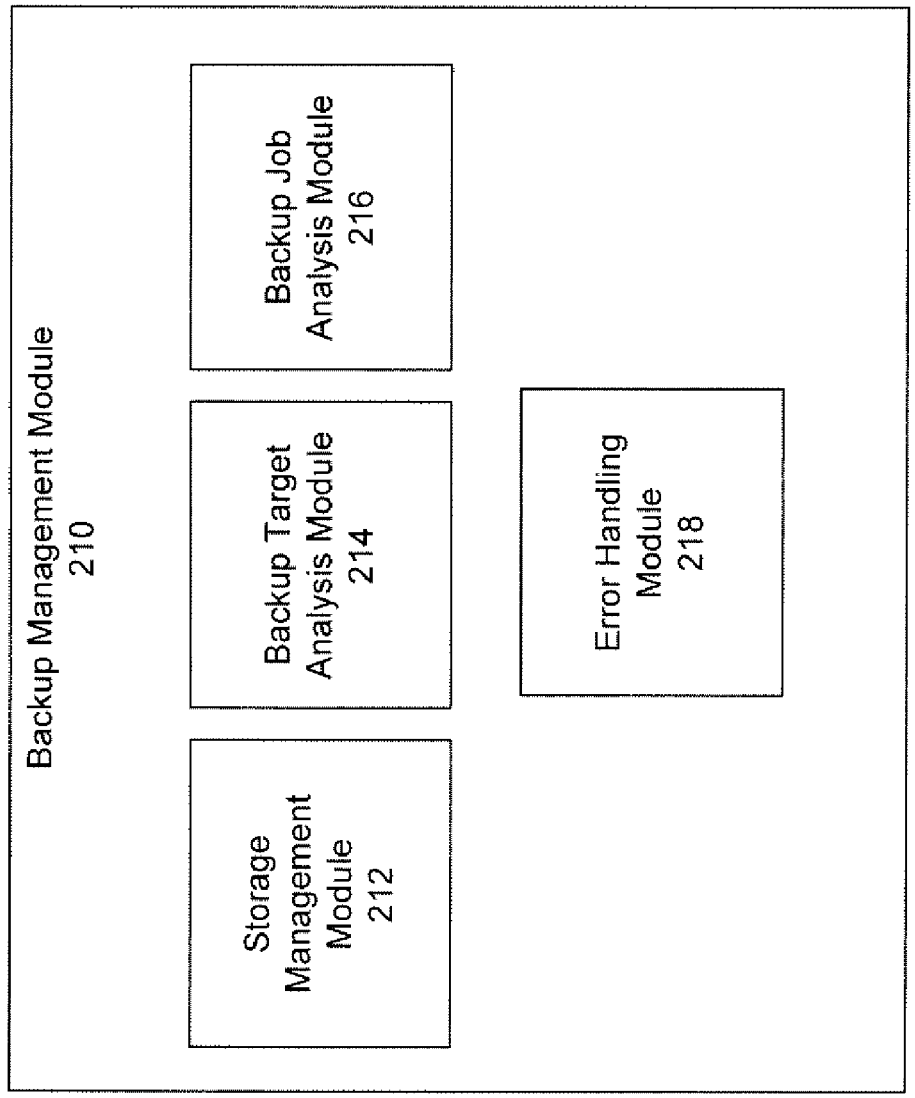
FIG. 2 shows a module for backing up distributed data in accordance with an embodiment of the present disclosure.

Referring to FIG. 2, there is shown a module for backing up distributed data in accordance with an embodiment of the present disclosure. As illustrated, FIG. 2 depicts a backup management module 210 which may contain one or more components including storage management module 212, backup target analysis module 214, backup job analysis module 216, and error handling module 218.

Storage management module 212 may identify one or more backup storage locations, such as storage 108, 118, and 126. Storage management module 212 may analyze storage locations capacity, throughput, capabilities, and/or attributes. For example, storage management module 212 may analyze utilization of a backup storage location, the ability of a backup storage location to support a parallel backup job, and/or the capacity of a backup storage location.

Backup target analysis module 214 may analyze one or more attributes and/or capabilities of a backup target source. For example, backup target analysis module 214 may identify membership in computing clusters, the location of nodes on a network, failover order in a cluster, replication latency in a cluster, or other computing cluster information. Backup target analysis module 214 may also identify application specific replication information, such as the primary copy of a application data store, one or more secondary copies of an application data store, the health of a copy of application data, the replication latency of a copy of application data, or other factors. Backup target analysis module 214 may determine the size of a backup target, whether a backup target is associated with other backups, and other criteria.

Backup job analysis module 216 may analyze user preferences, backup job requirements, network related factors, factors identified by storage management module 212, and/or factors identified by backup target analysis module 214. Backup job analysis module 216 may determine a resource impact or cost of one or more backup jobs, such as an impact on network congestion, an impact on CPU utilization of a backup target source or a backup storage location, or other factors. Backup job analysis module 216 may weight one or more potential backup jobs based on a resource impact. Backup job analysis module 216 may schedule one or more backup jobs with a lowest resource impact which may conform with user specified preferences and/or backup job requirements. Backup job analysis module 216 may improve the use of storage capability and bandwidth. Backup job analysis module 216 may lower network congestion. Backup job analysis module 216 may identify and schedule backup jobs which may be run in parallel to lower a time required for a backup.

Identified backup target sources, for which only high cost or high resource impact backup jobs or no backup jobs may be scheduled, may indicate the need for additional storage capacity closer to the backup target source. For example, the lack of low resource impact backup options may indicate a need for the addition of another storage location to a configured storage pool. In one or more embodiments, backup job analysis module 216 may facilitate backup planning by identifying backup jobs which may have a high resource impact.

Error handling module 218 may handle errors communicating with a backup target source, a backup storage location, an application, a network component, or another backup component. Error handling module 218 may log errors such as errors, send notifications, or perform corrective actions. For example, error handling module 218 may reschedule a backup for a different backup target source or a different backup storage location if an error with a scheduled resource is received.

Figure 3:
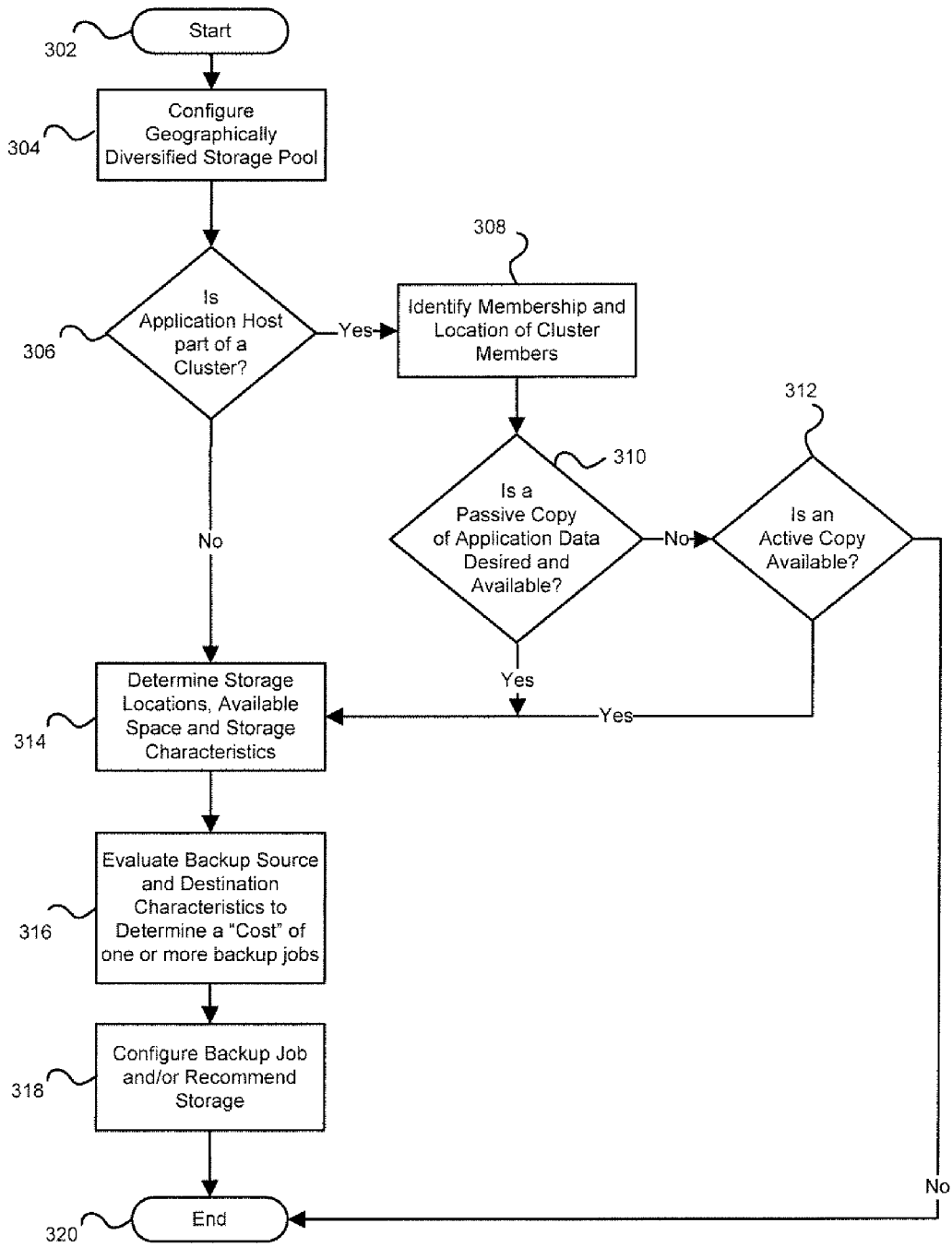
FIG. 3 shows a method 300 for backing up distributed data in accordance with an embodiment of the present disclosure.

Referring to FIG. 3, there is shown a method 300 for backing up distributed data in accordance with an embodiment of the present disclosure. At block 302, the method 300 for backing up distributed data, in accordance with an exemplary embodiment, may begin.

At block 304, the method 300 may configure a geographically diversified storage pool. This may reduce network traffic required for backup of one or more target backup sources, such as application servers, nodes, databases, hosts, or other backup targets. A backup process or component may utilize one or more specified preferences, requirements, or other backup factors to identify a backup storage location in a storage pool which may reduce the creation of network traffic or congestion during backup. A diversified storage pool may add redundancy and increase backup capacity.

At block 306, the method 300 may determine whether a backup target source, such as an application host, is part of a computing cluster or if application data is replicated by an application to other hosts. If the backup target source is part of a computing cluster or if application data is replicated, the method 300 may continue at block 308. If the backup target source is not part of a computing cluster or application data is not replicated, the method 300 may continue at block 314.

At block 308, the method 300 may identify membership, location and other attributes of backup target sources. Location of a backup target source may be identified using routing algorithms or protocols, such as the border gateway protocol.

At block 310, the method 300 may determine whether a passive or secondary copy of application data is desired and/or available. In one or more embodiments, a user may specify a preference for backup to be scheduled first for a passive or secondary node if it is available. In other embodiments, an active or primary node may be preferred first. If a secondary or passive node is available and preferred the method 300 may continue at block 314. If a secondary or passive node is not available or preferred the method 300 may continue at block 312.

At block 312, the method 300 may determine whether an active copy or a primary copy of data is available. If an active copy or a primary copy of data is available the method 300 may continue at block 314. If an active copy or primary copy of data is not available the method may end at block 320.

At block 314, locations of backup storage, capacities of backup storage, and other backup storage attributes may be determined. Other attributes may include network congestion associated with backup storage and/or utilization of backup storage.

At block 316, a backup job utilizing one or more backup target sources and one or more backup storage locations may be evaluated. User specified preferences, backup target location attributes, and/or backup storage location attributes may be evaluated. The method 300 may determine a resource impact or cost for one or more backup jobs. For example, one or more algorithms may be used to determine a network distance and network congestion between a backup target source and a backup storage location. Other measurements used in determining a resource impact or cost may include a utilization of a backup target source and/or a backup storage location, capacity of a backup storage location, and/or the ability of a backup component to support parallel backup.

At block 318, a backup job may be configured which may use identified low cost or low resource impact backup target sources, backup storage locations, and/or network routing. According to one or more embodiments, resource impact calculations determined in block 316 may be utilized to identify backup infrastructure or backup process improvements. Recommendations may include the addition of storage to a storage pool which may be located close to one or more backup targets and may reduce network traffic associated with backups.

At block 320, the method 300 may end.

At this point it should be noted that backing up distributed data in accordance with the present disclosure as described above typically involves the processing of input data and the generation of output data to some extent. This input data processing and output data generation may be implemented in hardware or software. For example, specific electronic components may be employed in a server or similar or related circuitry for implementing the functions associated with backing up distributed data in accordance with the present disclosure as described above. Alternatively, one or more processors operating in accordance with stored instructions may implement the functions associated with backing up distributed data in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for backing up distributed data comprising:
    identifying one or more sources of distributed data targeted for backup;
    identifying two or more backup storage locations;
    determining, using at least one computer processor, which one or more backup storage locations of the two or more identified backup storage locations to utilize for a backup job based at least in part on one or more specified preferences, wherein the determination is based at least in part on a calculated network distance between the at least one source of distributed data and the one or more backup storage locations; and
    configuring, for at least one of the sources of distributed data, the backup job using the one or more backup storage locations.

2. The method of claim 1, wherein the one or more specified preferences include utilizing the at least one source of distributed data and the one or more backup storage locations resulting in a low resource impact from the backup job.

3. The method of claim 2, wherein the low resource impact is based at least in part on at least one of: minimizing network congestion; available storage space of the one or more backup storage locations; processing capability of the one or more backup storage locations; resource utilization associated with the one or more backup storage locations; an ability of the one or more backup storage locations to support a parallel backup process; and an input/output rate of the one or more backup storage locations.

4. The method of claim 1, wherein the one or more specified preferences include an ability of the one or more backup storage locations to store multiple related backups.

5. The method of claim 4, wherein the multiple related backups comprise different Microsoft Exchange Databases associated with a single Microsoft Exchange Server.

6. The method of claim 4, wherein the multiple related backups comprise full and incremental backups that comprise a backup set.

7. The method of claim 4, wherein storing the multiple related backups at a single backup storage location enables the creation of a synthetic full backup.

8. The method of claim 1, wherein the one or more sources of distributed data targeted for backup are identified based at least in part on one or more specified characteristics of the one or more sources of distributed data targeted for backup.

9. The method of claim 8, wherein the one or more specified characteristics include at least one of: a health of the at least one source of distributed data; a computational load on a host of the at least one source of distributed data; an input/output load on a host; a number of units targeted for backup stored on a host; an ability of a host to support a parallel backup process; and a length of time a host is available for backup.

10. The method of claim 1, wherein the one or more sources of distributed data targeted for backup comprise data associated with an application and replicated by the application.

11. The method of claim 1, wherein the one or more sources of distributed data targeted for backup are associated with a computing cluster and are identified based at least in part on a user specified preference including at least one of: whether the at least one source of distributed data is associated with an active node of a computing cluster; whether the at least one source of distributed data is associated with a passive node of a computing cluster; whether an active node is available; and whether a passive node is available.

12. The method of claim 1, further comprising:
    configuring a geographically diverse storage pool using two or more identified backup storage locations.

13. The method of claim 1, further comprising utilizing one or more routing algorithms to determine a relative distance between the at least one source of distributed data and the one or more backup storage locations.

14. The method of claim 13, further comprising utilizing a routing algorithm to determine a lowest cost path between the at least one source of distributed data and a backup storage location.

15. The method of claim 1, wherein the one or more backup storage locations are utilized based at least in part on a data throughput sufficient to complete a backup from the at least one source of distributed data in a specified period of time.

16. The method of claim 1, further comprising:
    calculating a resource impact for backing up the one or more sources of distributed data targeted for backup; and
    identifying one or more locations to add backup storage based at least in part on a high calculated resource impact for the one or more sources of distributed data.

17. At least one non-transitory processor readable storage medium storing a computer program of instructions configured to be readable by at least one processor for instructing the at least one processor to execute a computer process for performing the method as recited in claim 1.

18. An article of manufacture for backing up distributed data, the article of manufacture comprising:
    at least one non-transitory processor readable storage medium; and instructions carried on the at least one non-transitory processor readable storage medium;
    wherein the instructions are configured to be readable from the at least one non-transitory processor readable storage medium by at least one processor and thereby cause the at least one processor to operate so as to:
        identify one or more sources of distributed data targeted for backup; identify two or more backup storage locations;

determine which one or more backup storage locations of the two or more identified backup storage locations to utilize for a backup job based at least in part on one or more specified preferences, wherein the determination is based at least in part on a calculated network distance between the at least one source of distributed data and the one or more backup storage locations; and configure, for at least one of the sources of distributed data, the backup job using the one or more backup storage locations.

19. A system for backing up distributed data comprising:

one or more processors communicatively coupled to a server; wherein the server is configured to:

identify one or more sources of distributed data targeted for backup;

identify two or more backup storage locations;

determine which one or more backup storage locations of the two or more identified backup storage locations to utilize for a backup job based at least in part on one or more specified preferences, wherein the determination is based at least in part on a calculated network distance between the at least one source of distributed data and the one or more backup storage locations; and configure, for at least one of the sources of distributed data, the backup job using the one or more backup storage locations.

* * * * *